United States Patent [19]

Mylenek

[11] 4,307,624
[45] Dec. 29, 1981

[54] TRANSMISSION GEAR SELECTOR ARM AND SLEEVES FOR SHIFTING FORKS

[75] Inventor: Chester Mylenek, Brighton, Mich.

[73] Assignee: Ford Motor Company, Dearborn, Mich.

[21] Appl. No.: 125,396

[22] Filed: Feb. 27, 1980

[51] Int. Cl.³ .............................................. G05G 5/10
[52] U.S. Cl. ........................................ 74/477; 74/359; 74/473 R
[58] Field of Search ...................... 74/359, 473 R, 477

[56] References Cited

U.S. PATENT DOCUMENTS

| | | | |
|---|---|---|---|
| 3,929,029 | 12/1975 | Kelbel | 74/477 X |
| 3,962,930 | 6/1976 | Frazee | 74/477 X |
| 4,193,316 | 3/1980 | Kelbel | 74/473 R X |

FOREIGN PATENT DOCUMENTS 1065364  4/1967  United Kingdom .................. 74/477

*Primary Examiner*—Allan D. Herrmann
*Attorney, Agent, or Firm*—Frank G. McKenzie; Donald J. Harrington

[57] ABSTRACT

A multiple speed ratio manual power transmission shifting mechanism and interlock for an automotive vehicle comprising primary torque delivery gears and a cluster gear assembly having gear elements engageable with each of the main torque delivery gears; two double-acting and one single-acting synchronizer clutch mechanisms for selectively actuating the five primary torque delivery gears a single shift rail and reverse relay assembly for actuating the synchronizer clutch mechanism, a reverse idler shiftable to a driving position or to an inoperative position by the action of a first selector pin mounted on the shift rail that selectively engages either of the double acting synchronizer clutch mechanisms or the reverse idler relay, and an interlock cooperating with the selector pin to block axial movement of the unselecting actuator mechanisms. A second selector pin is mounted on the shift rail for engaging and axially moving the single acting synchronizer clutch mechanism into engagement with the fifth forward speed gear. An interlock sleeve cooperates with the second selector pin to block axial movement of the single acting synchronizer clutch mechanism when the shift rail is in a position to engage the other gear actuating mechanisms.

5 Claims, 5 Drawing Figures

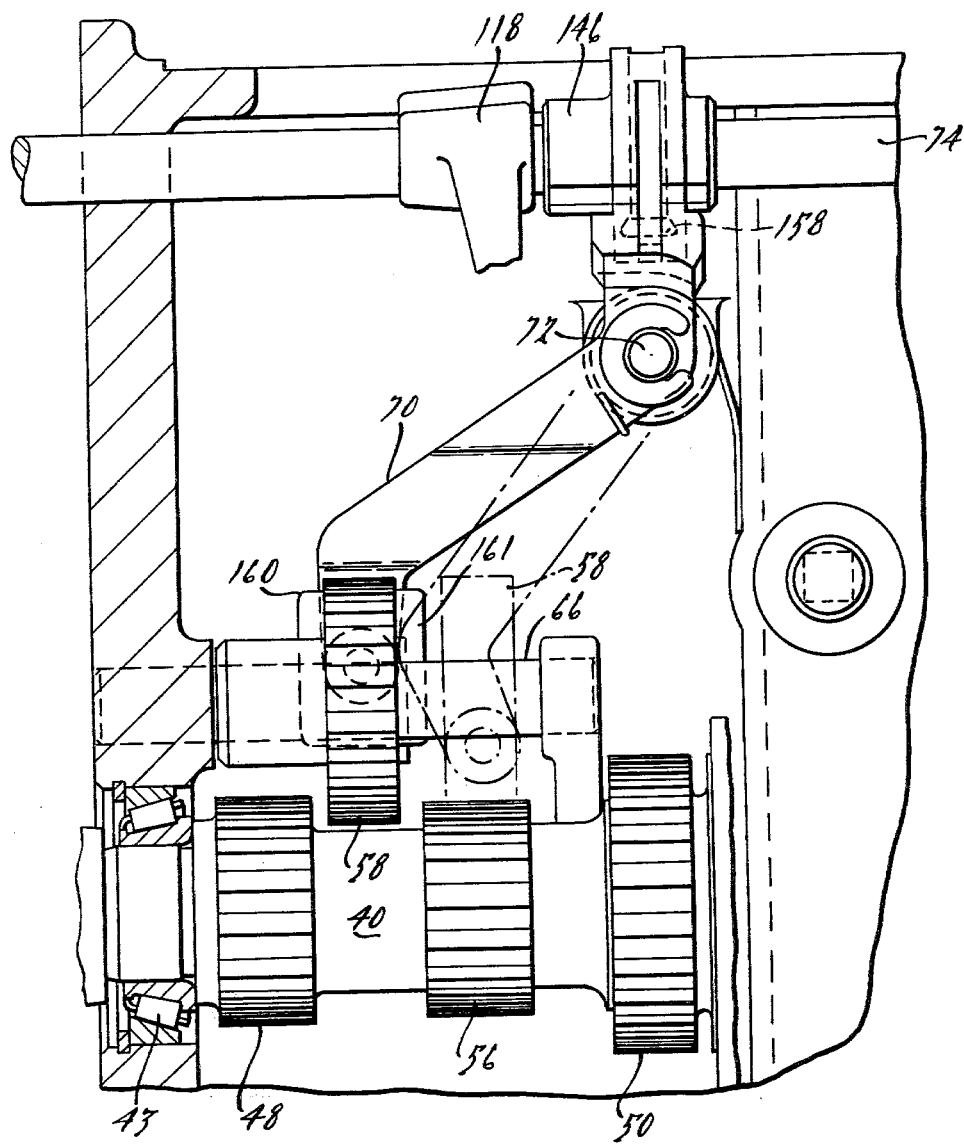

TRANSMISSION GEAR SELECTOR ARM AND SLEEVES FOR SHIFTING FORKS

BACKGROUND OF THE INVENTION

1. Field of the Invention

This invention relates generally to a manual transmission gearshift mechanism for an automotive vehicle and more particularly to such a shifting mechanism for the control of a five forward speed transmission providing an interlock to prevent shifting other than into the gear ratio selected by the vehicle operator.

2. Description of the Prior Art

The gearshift mechanism of a manual transmission is generally provided with some means associated directly with the shifting action of the mechanism that prevents accidental movement of more than one gear into driving engagement at a time. Various means have been described in the prior art for selectively engaging various speed ratios of the transmission while providing an interlock. Prior art patents directed to gear shift mechanisms for four speed transmissions having an interlock include U.S. Pat. Nos. 3,202,005; 1,973,553; and British patent nos. 1,053,353; 1,038,591; and 1,008,556.

An in-line manual transmission having five forward speed gear ratios and a reverse gear ratio presents particular problems regarding the shifting mechanism because of the distance of the fifth forward speed from the shifting and interlock mechanism that controls the gear shifting sequence among the five forward speeds and the reverse speed ratio. An additional difficulty arises with respect to coordinating the interlock function of the fifth forward speed ratio and mechanisms for interlocking and controlling gearshifting among the four lower gears of the transmission. The prior art has taught the use of multiple shift rails for coordinating the movement of various shifting forks. The British patent No. 1,038,591 is a typical example of a control mechanism employing multiple shift rails. The five forward speed manual transmission having an overdrive speed ratio requires a simple, inexpensive and trouble-free mechanism for providing the interlock in gear shifting functions.

SUMMARY OF THE INVENTION

The gearshift mechanism and interlock according to this invention operates with a single shift rail mounted for rotation about its central axis and for axial movement along the axis in response to control exercised by the vehicle operator. The five forward speed ratio gears and the reverse gear are selectively engaged; unselected gear ratios are blocked from engagement by the interlock.

Three gear selector forks are moved axially to cause synchronizer clutch sleeves to produce a driving connecting between the input and output shafts of the transmission. A first selector fork engages the synchronizer clutch sleeve for movement in a fore and aft direction whereby a first and second speed ratio is obtained. A second gear shift fork engages a second synchronizer clutch sleeve for movement to a forward or rearward position thereby producing a third and fourth forward speed ratio. A first interlock collar mounted for rotation upon the outer surfaces of the shift rail is secured by the transmission housing against axial movement. A first selector pin extending from the shift rail and capable of rotating the interlock collar is arranged to selectively and exclusively engage either the first or second shifting forks or a reverse idler relay lever. When the shift rail is rotated into a selected position, the selector pin engages one of these gear actuating devices and the inner collar prevents axial motion of the unselected gear select members.

A second interlock sleeve, similarly mounted on the shift rail, engages a third synchronizer clutch sleeve that is moved to a forward position to produce a fifth forward speed ratio or to a rearward, neutral position wherein this drive ratio is not produced. A third gearshift fork has a notch that is engaged by a second selector pin mounted on the shift rail and adapted to rotate the second interlock sleeve into a blocking position with the third gear selector fork.

The first and second selector pins are mounted in a circumferential sense on the shift rail in relation to the notches of the gearshift members so that only one notch is engaged at each position of the shift rail. The interlock collars and sleeves are similarly coordinated and arranged so that axial movement of all of the gearshift members is prevented except for the selected gearshift member. Axial motion of the gear actuating member is permitted by reason of the interlock collars and sleeves providing an axial slot into which the selector pins may pass. Axial motion of the selected gear actuating member causes the selected synchronizer clutch sleeve to move into engagement with the selected gear and to produce a driving connection beween the gear and the output shaft of the transmission.

BRIEF DESCRIPTION OF THE FIGURES OF THE DRAWINGS

FIG. 4 is an elevation view taken in the direction 4 as seen in FIG. 3 showing the reverse shift bell crank, reverse idler, its associated gearing and the control mechanism.

FIG. 5 is a cross-section taken at plane 5—5 of FIG. 1 showing the fifth speed overdrive interlock and gear shift mechanism of my invention. The selector pin is shown at the various positions it assumes during the various gear change positions of the shift rail.

DESCRIPTION OF THE PREFERRED EMBODIMENT

Figure 1:
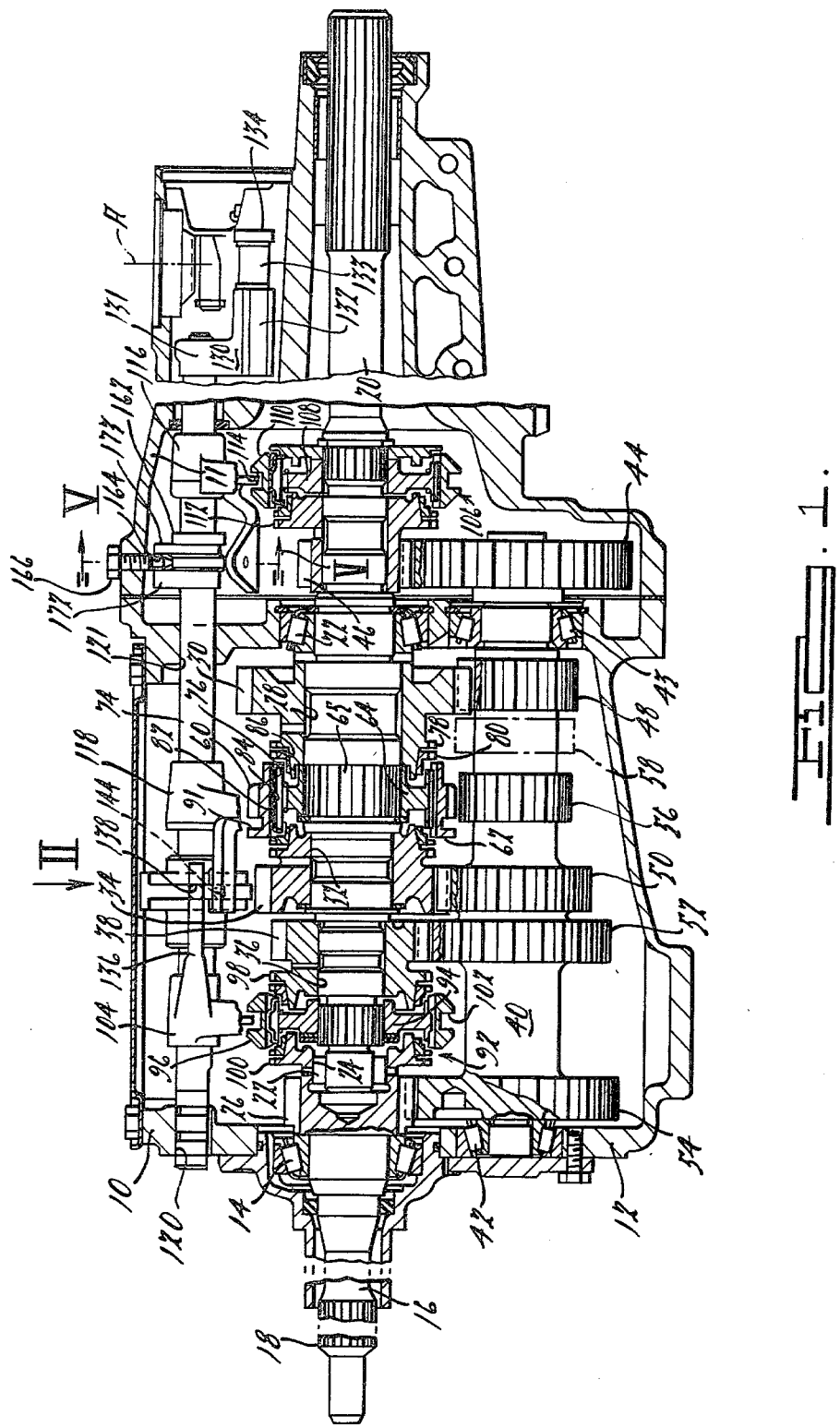
FIG. 1 is an elevation cross-section through an axial plane of the multiple speed ratio transmission that is controlled by the gear shift interlock mechanism of my invention.

With reference to FIG. 1, a transmission housing 10 containing the torque transmitting gear elements has a forward wall 12 which receives a front bearing 14 upon which the torque input shaft 16 is supported. The input shaft 16 is splined at 18 to permit a driving connecting with a friction clutch disc of a selectively engageable friction clutch (not shown) through which torque is delivered from the engine flywheel to the shaft 16. A power output shaft 20 is journalled at its forward end in the bearing 22 located in the opening 24 formed in the torque input gear 26, which is formed as an integral part of the input shaft 16.

The output shaft 20 has formed thereon a first bearing portion 28 on which a low speed ratio gear 30 is journalled, a second bearing portion 32 that journals a second speed ratio gear 34 and a third bearing surface 36 that journals a third speed ratio gear 38.

A countershaft 40 has its forward end supported in the bearing 42 and its rearward end in bearing 43. A torque output gear 44 is fixed to the countershaft 40 and meshes with an output gear 46, which is mounted on the output shaft 20. Formed integrally with or secured to the output shaft 40 are five drive gears shown respectively at 48, 50, 52, 54, and 56. These form a torque delivery path during operation in low speed ratio, second speed ratio, third speed ratio, fourth speed ratio and reverse, respectively. These drive gears are in mesh with the gears 30, 34, 38, and 26, respectively, to produce a forward drive condition. During reverse drive, gear 56 is selectively engageable with a reverse idler 58 that completes a torque delivery path that includes the reverse gear 60. The reverse gear 60 is formed on the synchronizer clutch sleeve 62, which is internally splined in sliding relationship on an externally splined synchornizer hub 64. Hub 64 is splined at 65 to the output shaft 20.

Reverse gear 60 is shown in its operative position for reverse drive in FIG. 1 and this position corresponds to the neutral condition for the synchronizer clutch assembly. When the reverse gear 60 is in the position shown, it can be engaged by a reverse drive idler 58, which is mounted slidably on a reverse pinion support shaft 66. Shaft 66, shown best in FIG. 4, is supported at each of its axial ends in openings formed in bosses in the transmission housing 10. The reverse idler 58 is seen in its edge view in FIGS. 1 and 4 and is seen in its end view in FIG. 3. When the idler 58 is shifted to its position as shown in FIG. 1, it moves out of meshing engagement with the reverse gear 56. When it is moved to its left hand position it is capable of being engaged by the reverse gear 56 to establish a reverse torque delivery path.

To establish the operative and inoperative position for the reverse idler 58, the operating end 68 of the relay lever 70 grips the opposite faces of the reverse idler 58, which is journalled on the reverse idler support shaft 66. The relay lever 70 is journalled on a stub shaft 72 mounted on the inner surface of the housing 10 and is caused to rotate about the axis of the stub shaft by way of the operation of the shift rail 74 whose motion is controlled by the vehicle operator. When the relay lever 70 is oscillated about the axis of the stub shaft 72, the reverse idler gear 58 moves axially on the shaft 66.

Synchronizer clutch sleeve 62 is formed with internal clutch teeth 76 that are adapted to engage external synchronizer clutch teeth 78 formed on the low speed ratio main gear 30 and has a shift fork groove 91, which receives the ends of the 1-2 shift fork 118. A synchronizer clutch blocker ring 80 has a cone clutch surface that registers with external cone clutch surfaces on the gear 30 in a fashion known to establish synchronism of the rotational velocities of the sleeve 62 with the gear 30 prior to a shift to the low speed ratio condition. The synchronizer clutch is actuated by the force applied to the ring 80 by the synchronizer clutch inserts 82, which are urged in a radially outwardly direction by a clutch spring. Axial force is applied to the synchronizer clutch inserts by detent projections 84 which register with a detent groove formed in the clutch teeth 76. A lost-motion driving connection between the synchronizer clutch and the gear 30 is provided to limit the extend of movement of the gear 30 relative to the clutch ring 80. This is achieved by the inserts 82, the ends of which enter the clutch ring slots, one of which is shown at 86.

Blocker ring teeth 88 formed on the blocker ring 80 prevent shifting movement of the sleeve 62 into clutching engagement with the clutch teeth 78. The motion of the output shaft 20 is out of synchronism with the motion of the gear 30. When synchronism is established, sleeve 62 can be moved to the clutching position to establish low speed ratio. At that time, torque is transmitted from the input shaft 16 through the input main gear 26 to the cluster gear element 54. Torque then passes from the cluster gear element 48 to the first gear 30 and to the output shaft 20.

Second gear 34 also is adapted to be selectively connected to the output shaft 20 through the synchronizer clutch mechanism identified generally by reference character 90. The synchronizer clutch mechanism 90 corresponds to the one described previously with reference to the first speed ratio main gear 30. It is actuated when the sleeve 62 is shifted in a forward direction as viewed in FIG. 1 thereby establishing a second underdrive speed ratio as the gear 34 is connected to the output shaft 20. Torque is delivered to the gear 34 from the cluster gear element 50 with which it meshes, hence to the output shaft 20 to which the gear 34 is driveably connected by the clutch mechanism 90.

When the sleeve 62 is shifted to the neutral position intermediate the associated synchronizer clutch structures, the gears 30 and 34 are disconnected from the output shaft 20 and the associated reverse gear 60 is positioned so that it may be engaged by the reverse idler gear 58 as the latter is shifted in a forward direction as viewed in FIG. 1.

A 3-4 synchronizer clutch mechanism is indicated generally by reference character 92. It includes a synchronizer hub 94, which is splined to the output shaft 20, and a synchronizer clutch sleeve 96, which has internal clutch teeth adapted to register with external clutch teeth 98 on gear 38 when the sleeve 96 is moved to a rearward position. The sleeve 96 is adapted to engage clutch teeth 100 formed on gear 26 when the sleeve 96 is moved into a forward position. A pair of synchronizers, similar to the synchronizer described with reference to gear 30, is provided for each of the gears 38 and 26. The sleeve 96 has a shift fork groove 102, which receives the ends of the 3-4 shift fork 104. To condition the synchronizer clutch mechanism 92 for third speed ratio operation, the synchronizer clutch sleeve 62 is moved to the neutral position shown in FIG. 1 and the sleeve 96 is moved in a rearward direction whereby input torque is transmitted from the input shaft 16 through gear 26, gear elements 54 and 52, third speed gear 38 and the output shaft 20. A shift to a fourth speed ratio is achieved by moving the synchronizer clutch sleeve 906 in a forward direction thereby connecting the main input gear 26 directly to the output shaft 20 by way of the synchronizer mechanism 92.

The reverse drive idler 58 is brought into driving engagement with reverse gear element 56 on the countershaft 40 through the operation of relay lever 70 as previously described. Thus during reverse drive operation, the torque delivery path is comprised of the input shaft 16, input gear 26, cluster gear elements 54 and 56, reverse idler gear 58, reverse drive gear 60 and the output shaft 20.

A fifth speed, overdrive clutch mechanism is indicated generally by reference character 106. It includes a synchronizer hub 108 splined to the output shaft 20. The synchronizer assembly 106 includes also a synchronizer clutch sleeve 110, which has internal clutch teeth adapted to register with external clutch teeth 112 on the overdrive gear 46 when the sleeve 110 is moved in a forward direction. A synchronizer, similar to the synchronizer described with reference to the gear 30, is provided for the overdrive gear 46. The sleeve 110 has a shift fork groove 114, which receives the ends of the fifth speed ratio overdrive shift fork 116.

To condition the synchronizer shift mechanism for fifth speed ratio operation, the synchronizer clutch sleeves 62 and 96 are moved to the neutral positions shown in FIG. 1 and the sleeve 114 is moved to a forward position thereby causing clutching engagement with the internal clutch teeth 112 of the overdrive gear 46. In this way, torque is transmitted from the input shaft 16 through the input gear 26, cluster gear elements 54 and 44, the overdrive gear 46, and to the output shaft 20 by way of the synchronizer clutch mechanism 106.

Figure 2:
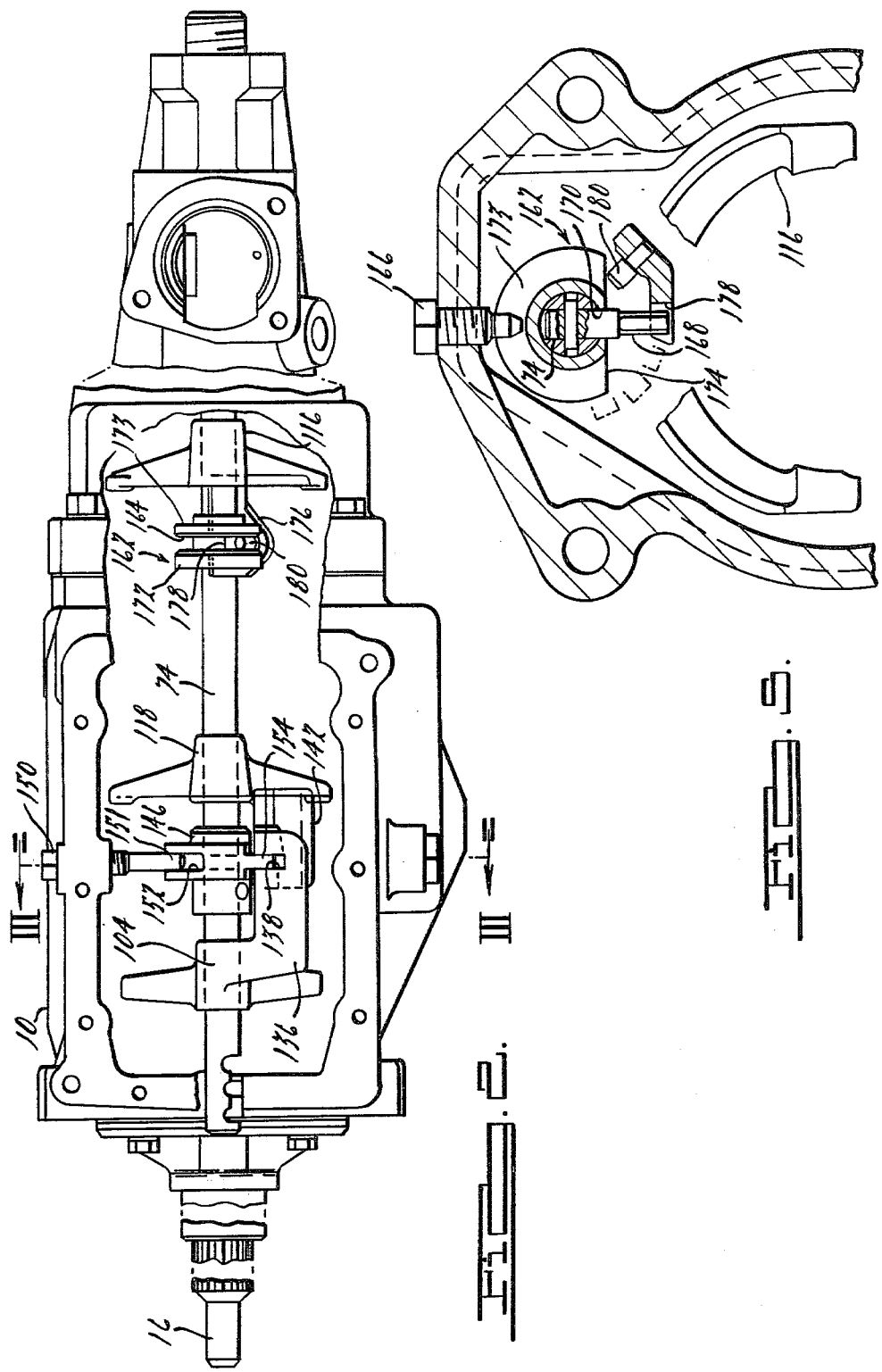
FIG. 2 is a plan view of the transmission and gear shift control mechanism of FIG. 1, the cover and a portion of the housing being removed to show the gear shifting mechanism more clearly.

Referring now to FIGS. 1 and 2, a shift rail 74 extends in generally parallel arrangement with the shafts 16, 20, 40 and is journalled along its length on surfaces 120, 121 formed in the transmission housings 10, 11. Rotation and axial displacement of the shift rail 74 is accomplished by the action of a shift cane assembly shown at the rearward end of the shift rail. A similar cane assembly is described and illustrated in U.S. patent application Ser. No. 889,686, filed Mar. 24, 1978 and is incorporated herein by reference.

Block 130 is mechanically fastened to the rearward extremity of the shift rail 74 and furnishes a radially extending portion 131 that extends from the central axis of the shift rail to an axially directed portion 132. The axial portion 132 has a reduced-section pin portion 133 extending therefrom and terminating in an end portion 134. A shift cane (not shown) is controlled by the vehicle operator and pivots about the point A. The base of the shift cane carries a pair of forked parts that straddle the offset shift lever portion 133. The shift lever portion 133 carries a pair of stops 132 and 134 positioned fore and aft of the forked parts. The offset shift rail portion joined to the shift rail 74 by the arm portion 131 of the block 130, thereby define a crank as best seen in FIG. 1. In this way, by reason of the eccentric attachment of the end block 130 on the shift rail 74, lateral motion of the shift cane causes the shift rail 74 to rotate about its central longitudinal axis. Furthermore, forward and rearward motion of the shift cane causes its forked end to contact the end portion 134 and the axially extending portion 132 thereby causing the shift rail 74 to be displaced axially on the support surfaces 120, 121 of the transmission housings 10, 11. The shift forks 104, 116, 118 mounted on the shift rail are thereby caused to rotate and to move axially as the shift cane is moved by the vehicle operator. Forward movement of the shift cane, however, causes rearward axial movement of the shift rail 74 and leftward movement of the shift cane produces a radially opposite directional movement of the end block 130. It is apparent therefore, that if the cane is moved in a plane that is perpendicular to the plane of the section of FIG. 1, the shift rail will be rotated about its central axis. It is apparent also that if the cane is oscillated in a plane parallel to the plane of FIG. 1, the shift rail will be moved fore and aft in the direction of its axis. Thus the cane is capable of imparting a compound motion to the shift rail 74.

Figure 3:
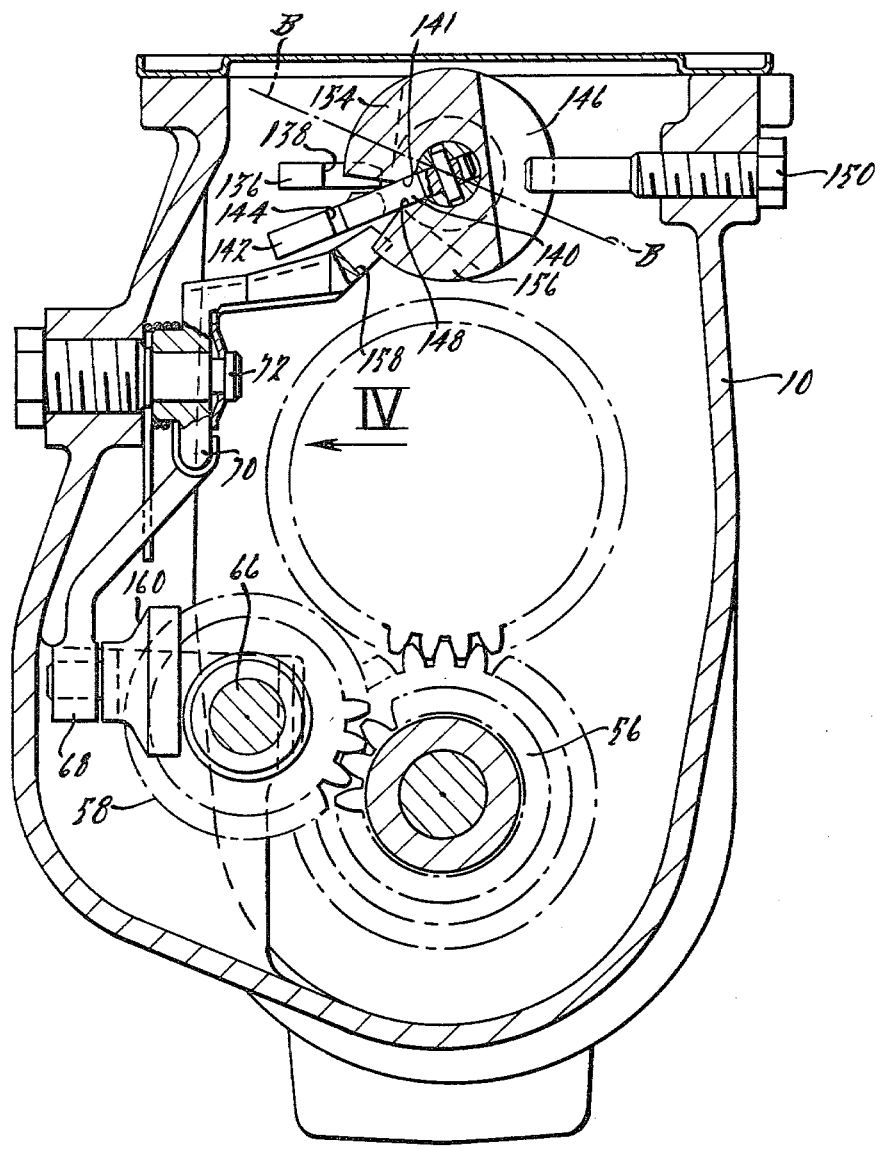
FIG. 3 is a cross-section taken at plane 3—3 of FIG. 2.

Referring to FIGS. 2 and 3, the shift rail 74 carries the 3-4 shift fork 104, which has a foot 136 extending therefrom having a recess 138 adapted to receive a pin 140 when the pin is moved into registry with it. The 1-2 shift fork 118 also includes an axially extending foot portion 142 underlying the foot 136 and having a recess 144 adapted to register with the pin 140 when the recess 144 is aligned with the pin. The pin 140 is secured to the shift rail 74 and extends radially outwardly therefrom. An interlock collar 146 is loosely mounted on the shift rail 74 and includes an axial slot 148 best seen in FIG. 3, through which the pin 140 extends. As the pin 140 rotates about the axis of the shift rail 74 upon rotation of the shift rail, the interlock collar 146 also is caused to rotate by reason of the bearing contact of the pin 140 in the slot 148. The collar 146 is prevented from movement in a fore and aft direction by a retention bolt 150 that is mounted on the housing 10 and has an inner end 151 received within a truncated annular notch 152 formed in the collar 146. The collar also has an upper blocking flange 154 and a lower blocking flange 156, each of which extends radially outwardly from the axis of the shift rail in general alignment with the pin 140.

The interlock collar 146 operates to assure movement of only one shift fork, either the 1-2 shift fork 104 or the 3-4 shift fork 118. As illustrated in FIG. 3, as the interlock collar 146 rotates due to the bearing contact of the pin 140 in the slot 148, the pin 140 is brought into registry with either the recess 138 of the shift fork 104, the recess 144 of the shift fork 118 or the slot 158 formed on the end of the relay lever 70. The extent to which the operator controls the amount of rotation of the shift rail 74 will determine whether the pin 140 engages either the shift fork 104 or 118 or the relay lever 70. When the interlock collar is rotated the blocking flanges 154, 156 are moved into locking position and into abutting contact with either of the shift forks or the relay lever that has not been engaged by the pin 140.

The operation of the blocking collar and selective pin is best illustrated in FIG. 3. In that figure the pin 140 is seen to have been rotated into engagement with the notch 158 formed on the relay lever 70. The pin 140 in that position has caused the interlock collar 146 to have been rotated to a position where the upper blocking flange 154 is in abutting engagement with the slot 138 on the arm 136 of the shift fork 104 and the slot 144 on the arm 142 of the shift fork 118. When the shift rail is rotated in a clockwise direction as viewed in FIG. 3 to a point where the pin 140 is received in the slot 138 of the 3-4 shift rail 104, the lower blocking flange 156 will have been rotated by the pin 140 into engagement with the recess 144 of the 1-2 shifting fork 118 and the slot 158 of the arm 70 relay. Similarly, when the shift rail is rotated clockwise sufficiently to bring pin 140 into engagement with notch 144 on the arm 142 of the 1-2 shift fork 118, the upper blocking flange 154 will have been rotated by the pin into abutting engagement in the slot 138 of the 3-4 shifting fork 104 and the lower blocking flange 156 will have been brought into engagement in the slot 158 on the relay arm 70.

When the pin 140 registers with the slot 138, the interlock collar 146 prevents axial shifting movement of the shift fork 118 and rotation of the reverse relay lever 70 about its axis on the stub shaft 172. When the pin 140 registers with the slot 144, the interlock collar 146, by way of the blocking flanges 154 and 156, prevents axial shifting movement of the 3-4 shift fork 104 and rotation of the reverse lever 70 about its axis on stub shaft 72. Similarly, when the pin 140 registers with the slot 158 of the relay lever 70, the interlock collar 146 prevents axial shifting movement of both of the shift forks 104, 118.

At the opposite end of relay lever 70, a pair of outwardly extending flanges 160, 161 are forward on the end 68 and grip axially opposite faces of the reverse idler 58 therebetween. As the relay lever 70 is rotated about the axis of the stub shaft 72 by axial movement of the shift rail 74 the slot 158 is engaged by the selector pin 140, reverse idler 158 is moved axially into engagement with the reverse drive cluster gear element 56 formed on the countershaft 40 of the idler. In this way, idler 58 is brought into engagement with the reverse gear 60 that is formed on the outer surface of the synchronizer clutch sleeve 62 thereby establishing a reverse drive torque delivery path that includes the input shaft 16, the input gear 26, the cluster gear elements 54, 56, the reverse idler 58, reverse gear 60 and the output shaft 20.

When the shift rail 74 is rotated clockwise so that the pin 140 is in general alignment with the axis B-B of FIG. 3, the lower blocking flange 156 will engage the slots 138, 144 and 158, thereby preventing axial shifting motion of the 1-2 shifting fork 118, the 3-4 shifting fork 104 and rotation of the reverse idler relay lever 70. With the pin 140 aligned with the axis B-B, the shifting mechanism of the transmission is disposed for the fifth forward speed ratio operation, the next to be described.

A second interlock sleeve 162 is loosely fitted on the shift rail 74 between the interlock sleeve 146 and the attachment of the shift cane at 133. The sleeve 162 illustrated in FIGS. 1, 2 and 5 has an annular slot 164 into which the inner end of the interlock bolts 166 is fitted. The bolt, which is threaded through the housing 11, similarly prevents axial movement of the sleeve 162 but allows the shift rail 74 to be moved axially with respect to sleeve 162. A selector pin 168 is fixed to the shift rail 74 and extends outwardly therefrom through a radially extending hole 170 formed in the sleeve 162. The selector pin 168 is tightly fitted in the hole 170; therefore, when the shift rail is rotated about its axis, the pin 168 causes the sleeve 162 to rotate as well. The sleeve 162 has forward and rearward flanges 172, 173 that define the slot 164 therebetween. As best seen in FIG. 5, the predominantly circular outer periphery of the flanges 172, 173 is truncated at 174. the fifth forward speed shifting fork 116 has an axially extending arm portion 176 in which a notch 178 is formed and positioned axially in alignment with the pin 168. The fork 116 is adapted to bring the notch 178 into registry with pin 168 as the shift rail 74 is rotated since the fork is loosely mounted on the shift rail 74 for axial displacement and rotation therewith. Arm 176 of the shift fork 116 provides a surface on which a pin 180 is mounted and directed generally toward the axis of the shift rail 74. The pin engages the slot 164 of the sleeve 162 between the forward and rearward flanges 172, 173.

Referring to FIG. 5, as the shift rail is rotated about its central axis, the pin 168 assumes the various positions indicated. When the gearshift mechanism is disposed for fifth forward speed gear ratio operation, the pin 168 engages the notch 178 of the shift fork 116 and causes the sleeve 162 to rotate so that the interlock pin 180 engages the slot 164 of the sleeve 162. As has previously been described, rotation of the shift rail will align selector pin 140 with the axis B-B of FIG. 3. The lower blocking flange 156 will have engaged respectively the notches of the 1-2 shifting fork 118, the 3-4 shifting fork 104 and the reverse relay lever 70, thus preventing axial displacement of these with respect to the transmission housing. The vehicle operator, by first moving the shift cane transversely to the fifth speed ratio shift path, causes the pin 168 to engage the notch 178 of the shift fork 116. The operator then moves the shift cane rearwardly thereby causing the shift rail 74 to be moved in the forward direction. The selector pin 168 moves the shift fork 116 forwardly with the shift rail. The external clutch teeth 112 are engaged by the clutch teeth of the sleeve 110 thereby connecting gear 46 to the output shaft 20.

When the gearshift mechanism is disposed for the first, second, third, or fourth forward speed ratio operation, or for reverse operation, the pin 168 is arranged in the various positions indicated in FIG. 5 but does not engage the notch 178. The sleeve 162 is rotated with the pin 168 on the axis of the shift rail so that the blocking flanges 172 and 173 engage the axially opposite ends of the interlock pin 180. In this way the overdrive shift fork 116 is prevented from moving with the shift rail because the sleeve 162 is fixed against axial displacement by the bolt 162 and its abutting contact with the blocking flanges 172, 173.

Changes and modifications in a specifically described embodiment can be carried out without departing from the scope of the invention, which is intended to be limited only by the scope of the appended claims.

Having best described a preferred embodiment of my invention, what I claim and desire to secure by U.S. Letters Patent is:

1. In a transmission including a housing; an input shaft and an output shaft journalled in the housing; first, second, third and fifth forward speed gears journalled on the output shaft, a fourth forward speed gear fixed to the input shaft; first synchronizer clutch means connected to the output shaft having a reverse gear formed thereon for connecting selectively the first gear and the second gear to the output shaft; second synchronizer clutch means connected to the output shaft for connecting selectively the third and the fourth gears to the output shaft; third synchronizer clutch means connected to the output shaft for selectively connecting the fifth gear to the output shaft; a cluster gear assembly having gear elements respectively engaged with the first, second, third, fourth and fifth speed gears; a reverse drive idler journalled for rotation about an axis parallel to the axis of the output shaft, engageable with a reverse gear element of the cluster gear assembly and the reverse gear of the first synchronizer clutch means, the gear shift and interlock mechanism comprising;

a shift rail mounted for axial movement and rotation having first and second selector pins fixedly secured thereto and extending therefrom;

a first shift fork slideably mounted on said shift rail, engageable with the first synchronizer clutch means and the first selector pin and adapted to be moved axially by the pin;

a second shift fork slideably mounted on said shift rail, engageable with the second synchronizer clutch means and the first selector pin and adapted to be moved axially by the pin;

a pivotably mounted reverse drive lever having a first end engageable by the first selector pin and a second end adapted to move the reverse idler into engagement with the reverse drive element of the cluster gear assembly and with the reverse gear of the first synchronizer clutch means;

a third shift fork mounted on the shift rail, engageable with said third synchronizer clutch means, adapted to be engaged by the second selector pin and to be moved axially thereby;

first interlock means fixed against axial movement and mounted for blocking axial movement of said first and second shift forks and rotation of said reverse drive lever when said second selector pin engages said third shift fork, for selectively blocking such axial movement and rotation when said first selector pin engages either of said first or second shift forks or said reverse drive lever, but selectively permitting the axial movement of either the first or second shift fork or rotation of the reverse drive lever when said first selector pin is engaged therewith, whereby the first, second, third or fourth gears and the reverse gear are connected to said output shaft when the shift rail is moved;

second interlock means fixed against axial movement and mounted for blocking axial movement of said third shift fork when said first selector pin engages said first or second shift forks or said reverse drive lever, but permitting axial movement of said third shift fork when said second selector pin engages said third shift fork, whereby said fifth speed gear is connected to said output shaft by said third synchronizer clutch means when said shift rail is moved.

2. The gearshift and interlock mechanism of claim 1 wherein said first interlock means comprises:

a first retention bolt fixed to said housing and providing an inner end portion that extends within the housing;

a first interlock collar journalled on said shift rail including an axial slot through which the first selector pin extends and upon whose periphery said first selector pin bears;

an annular slot into which the inner end portion of the first retention bolt is fitted to prevent axial movement of said interlock collar; and a blocking flange rotatable into abutting engagement with said first and second shift forks and said reverse drive lever having a notch formed therein providing clearance for said first selector pin, whereby said first selector pin is permitted to move axially and to move either of said first and second shift rails or said reverse drive lever.

3. The gearshift and interlock mechanism of claim 1 wherein said third shift fork further includes a pin mounted therein on and extending toward said shift rail and wherein said second interlock means comprises:

a second retention bolt fixed to said housing and providing an inner end portion that extends within said housing;

a second interlock collar journalled on said shift rail including:

an axially directed slot through which the second selector pin extends and upon whose periphery said second selector pin bears;

a slot into which the inner end portion of the second retention bolt is fitted to prevent axial movement of said second interlock collar; and a slot engageable by the pin mounted on said third shift fork when said second selector pin is rotated out of engagement with said third shift fork and being unengageable by the pin mounted on said third shift fork when said second selector pin is rotated into engagement with said third shift fork, whereby said second selector pin rotates said second interlock collar into and out of engagement with the third shift fork mounted pin and second selector pin moves said third shift fork axially when engaged thereby but said third shift fork is prevented from being moved axially unless engaged by said second selector pin.

4. The gearshift and interlock mechanism of claim 1 wherein said first and second shift forks and said reverse gear lever have recesses formed therein disposed in such relation to said first selector pin that said first selector pin is brought into selective engagement therewith as said shift rail is rotated about its central axis.

5. The gearshift and interlock mechanism of claim 1 wherein said third shift fork has a recess formed therein disposed in such relation to said second selector pin that said second selector pin is brought into engagement therewith as said shift rail is rotated about its central axis.

* * * * *